(12) United States Patent
Ahn et al.

(10) Patent No.: US 12,416,753 B2
(45) Date of Patent: Sep. 16, 2025

(54) OPTICAL FIBER FIXING DEVICE

(71) Applicants: HYUNDAI MOTOR COMPANY, Seoul (KR); KIA CORPORATION, Seoul (KR)

(72) Inventors: Byoung Suk Ahn, Gwacheon-si (KR); Jung Wook Lim, Seoul (KR); Seung Sik Han, Hwaseong-si (KR); Ki Hong Lee, Seoul (KR); Sung Ho Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 451 days.

(21) Appl. No.: 17/860,812

(22) Filed: Jul. 8, 2022

(65) Prior Publication Data

US 2023/0062856 A1 Mar. 2, 2023

(30) Foreign Application Priority Data

Sep. 1, 2021 (KR) .......................... 10-2021-0116033

(51) Int. Cl.
*G02B 6/00* (2006.01)
*F21V 8/00* (2006.01)

(52) U.S. Cl.
CPC .................................... *G02B 6/001* (2013.01)

(58) Field of Classification Search
CPC ....... G02B 6/4452; G02B 6/3644; G02B 6/00
See application file for complete search history.

(56) References Cited

U.S. PATENT DOCUMENTS

| | | | | |
|---|---|---|---|---|
| 4,997,259 | A | * 3/1991 | Ichimura | G02B 6/0006 |
| | | | | 385/115 |
| 9,103,713 | B2 | 8/2015 | Launay et al. | |
| 9,817,201 | B2 | * 11/2017 | Lee | G02B 6/4452 |
| 10,120,154 | B2 | 11/2018 | Ohara | |
| 10,241,272 | B2 | 3/2019 | Irisawa | |
| 10,458,616 | B2 | 10/2019 | Orisich et al. | |
| 2012/0141070 | A1 | * 6/2012 | Sabo | G02B 6/4257 |
| | | | | 385/60 |
| 2014/0036635 | A1 | 2/2014 | Launay et al. | |
| 2018/0299092 | A1 | 10/2018 | Orisich | |
| 2018/0329142 | A1 | 11/2018 | Irisawa | |

FOREIGN PATENT DOCUMENTS

| | | | |
|---|---|---|---|
| JP | 2005019155 A | | 1/2005 |
| JP | 6475367 B2 | | 2/2019 |
| KR | 100970441 B1 | * | 7/2010 |
| KR | 101825145 B1 | | 2/2018 |
| KR | 20190015602 A | | 2/2019 |
| WO | 2016204779 A1 | | 12/2016 |

* cited by examiner

*Primary Examiner* — Jennifer Doan
(74) *Attorney, Agent, or Firm* — Lempia Summerfield Katz LLC

(57) ABSTRACT

An optical fiber fixing device is capable of immediately responding to changes in the length of an optical fiber caused by environmental changes. Breakage or cracking of the optical fiber attributable to changes in the length of the optical fiber and unintended changes in the shape of an image may thereby be prevented.

11 Claims, 9 Drawing Sheets

OPTICAL FIBER FIXING DEVICE

CROSS-REFERENCE TO RELATED APPLICATION

This application claims the priority to and the benefit of Korean Patent Application No. 10-2021-0116033, filed on Sep. 1, 2021, in the Korean Intellectual Property Office, the disclosure of which is incorporated herein by reference.

BACKGROUND

1. Field of the Disclosure

The present disclosure relates to a device for fixing an optical fiber, and more particularly to an optical fiber fixing device capable of immediately responding to contraction and expansion of an optical fiber caused by changes in the length thereof, thereby preventing deformation or cracking of the optical fiber.

2. Description of the Related Art

In general, an optical fiber is configured to totally reflect light and is mainly used as a means for transmitting information in a communication system. Also, an optical fiber is used to express an image using light. For example, an optical fiber may be applied to a vehicle taillamp in order to provide information related to motion of the vehicle to a neighboring vehicle or a pedestrian.

In order to express a certain image using an optical fiber, both ends of the optical fiber are fixed. Such an optical fiber is made of a glass-based or polymer-based resin, has a relatively small diameter, and is thus easily affected by environmental conditions. In particular, an optical fiber changes in length according to changes in temperature.

An optical fiber expands at a high temperature of 100 degrees Celsius (212 degrees Fahrenheit) or higher, and repeatedly expands and contracts in an environment in which a high temperature and a low temperature alternate. The extent to which the length of an optical fiber changes depending on environmental conditions ranges approximately from 0.2% to 2%. When an optical fiber contracts, breakage or cracking can occur in the optical fiber due to a reduction in the length thereof. This leads to deterioration in light distribution performance and unintended changes in the shape of the image to be expressed by the optical fiber. Also, when an optical fiber expands, the image to be expressed thereby changes, thus providing unclear or incorrect information.

The information disclosed in this Background section is only to enhance understanding of the general background of the disclosure. This Background section should not be taken as an acknowledgement or any form of suggestion that this information forms the related art already known to a person having ordinary skill in the art.

SUMMARY

Therefore, the present disclosure has been made in view of the above problems. It is an object of the present disclosure to provide an optical fiber fixing device capable of immediately responding to changes in the length of an optical fiber caused by environmental changes. Breakage or cracking of the optical fiber attributable to changes in the length of the optical fiber and unintended changes in the shape of an image are thereby prevented or inhibited.

In accordance with the present disclosure, the above and other objects can be accomplished by the provision of an optical fiber fixing device. The optical fiber fixing device includes: a sub-bracket configured to allow an end of an optical fiber to be inserted thereinto and fixed thereto; a main bracket having an insertion space formed therein corresponding to the sub-bracket to allow the sub-bracket to slide therein in response to changes in the length of the optical fiber; and an elastic member disposed between the sub-bracket and the main bracket such that one end of the elastic member supports the main bracket and an opposite end of the elastic member supports the sub-bracket.

The sub-bracket may have an optical fiber insertion hole formed therein to allow the end of the optical fiber to be inserted thereinto. The sub-bracket may also have an adhesive injection hole formed therein to allow an adhesive to be injected thereinto in order to fix the end of the optical fiber to the sub-bracket.

The sub-bracket may have a hexahedral shape. The optical fiber insertion hole may be formed through two opposite side surfaces of the sub-bracket and the adhesive injection hole may be formed in the upper surface of the sub-bracket.

The end of the optical fiber may be primarily fixed to the sub-bracket using the adhesive and may be secondarily fixed to the sub-bracket using a heat-staking method after penetrating the optical fiber insertion hole.

The elastic member may be a coil spring having a coil structure surrounding the optical fiber. One end of the coil spring may support the main bracket and the opposite end of the coil spring may support the sub-bracket.

The elastic member may be a rib-shaped rib spring provided at the sub-bracket so as to protrude toward the main bracket.

The main bracket and the sub-bracket may be formed to have a sufficient dimension in the width direction in order to fix a plurality of optical fibers thereto. The sub-bracket may have therein a plurality of optical fiber insertion holes, arranged at predetermined intervals, and a plurality of adhesive injection holes, arranged at predetermined intervals. One end of each of the plurality of optical fibers may be inserted into a corresponding one of the plurality of optical fiber insertion holes and may be fixed to the sub-bracket. The elastic member may be provided in a plural number in consideration of the number of optical fibers and the plurality of elastic members may be disposed between the main bracket and the sub-bracket.

The plurality of elastic members may be disposed between the main bracket and the sub-bracket so as to be provided for optical fibers located at the outermost positions.

The main bracket may have a toroidal shape and the sub-bracket may have a toroidal shape having a smaller inner diameter than the main bracket so as to be seated in the main bracket. The sub-bracket may slide upwards and downwards in the insertion space in the main bracket in response to changes in the length of the optical fiber.

The optical fiber fixing device may further include a fixing bracket provided at the opposite end of the optical fiber in order to fix the opposite end of the optical fiber.

The optical fiber fixing device may further include a light source provided at the opposite end of the optical fiber so as to be connected to the optical fiber in order to emit light to the optical fiber.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION OF THE EMBODIMENTS

The above-mentioned objects, features, and advantages should become more apparent from the following description described below in detail with reference to the accompanying drawings. In describing the present inventive concept, when it is determined that a detailed description of a well-known technology associated with the present disclosure may unnecessarily make the gist of the present invention unclear, the same has been omitted. The present inventive concept may be embodied in many alternative forms and should not be construed as being limited to the embodiments set forth herein.

Figure 1:
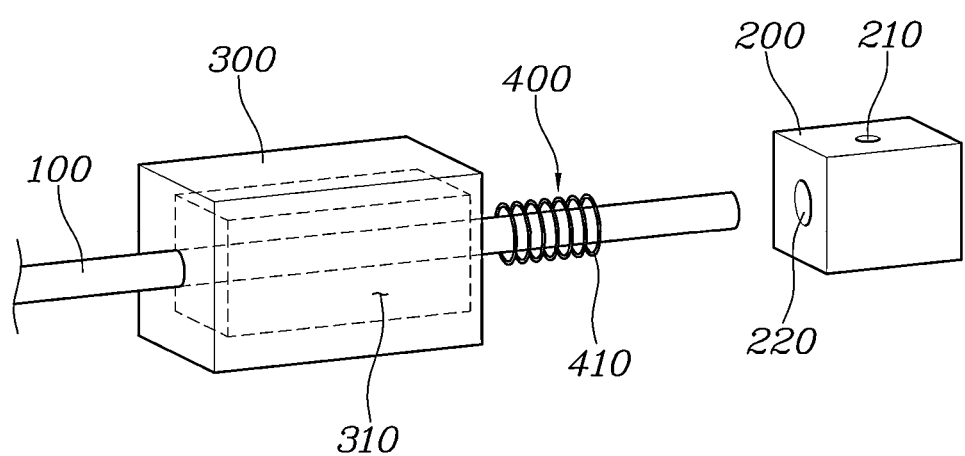
FIG. 1 is an exploded perspective view of an optical fiber fixing device according to a first embodiment of the present disclosure.
Figure 2:
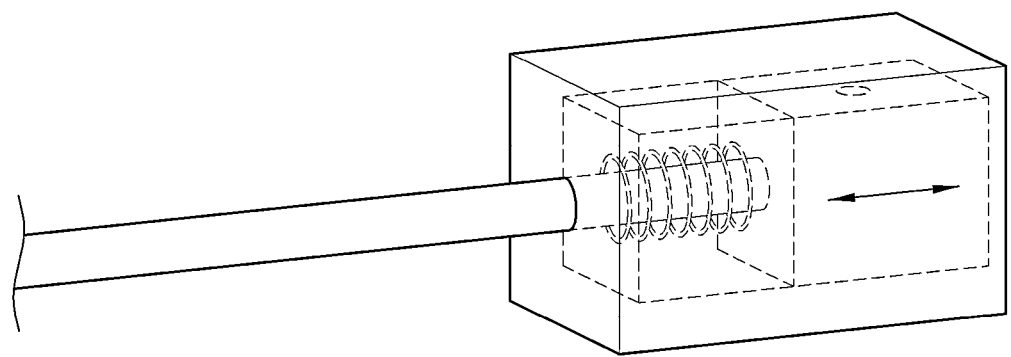
FIG. 2 is a view showing operation of the optical fiber fixing device according to the first embodiment of the present disclosure.
Figure 3:
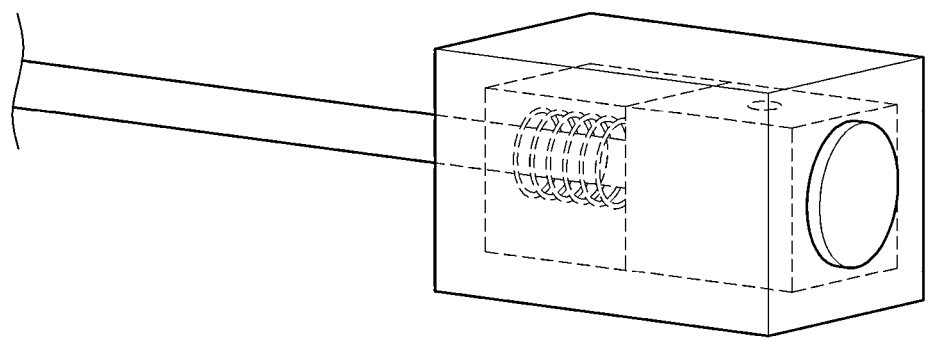
FIG. 3 is a view showing the optical fiber fixing device according to the first embodiment of the present disclosure.
Figure 4:
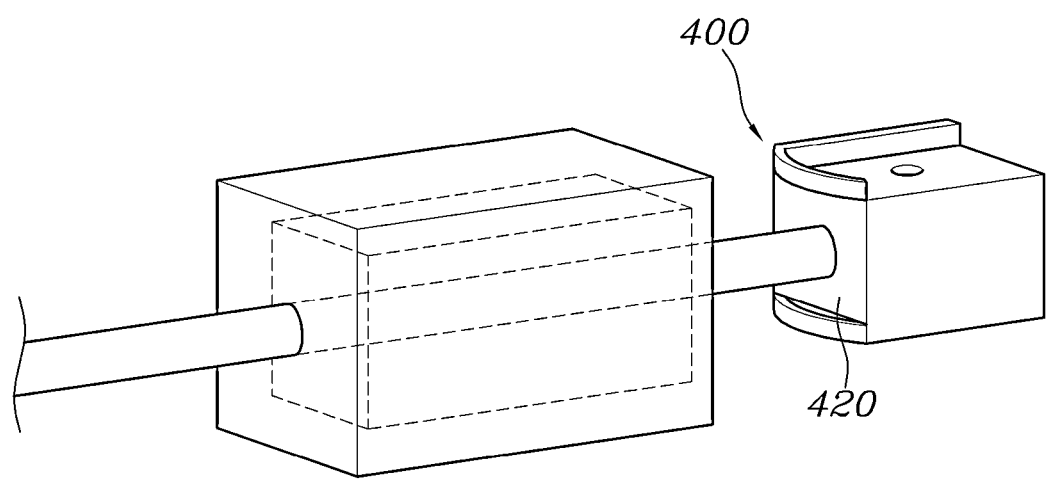
FIG. 4 is a view showing the optical fiber fixing device according to the first embodiment of the present disclosure, in which an elastic member is implemented as a rib spring.
Figure 5:
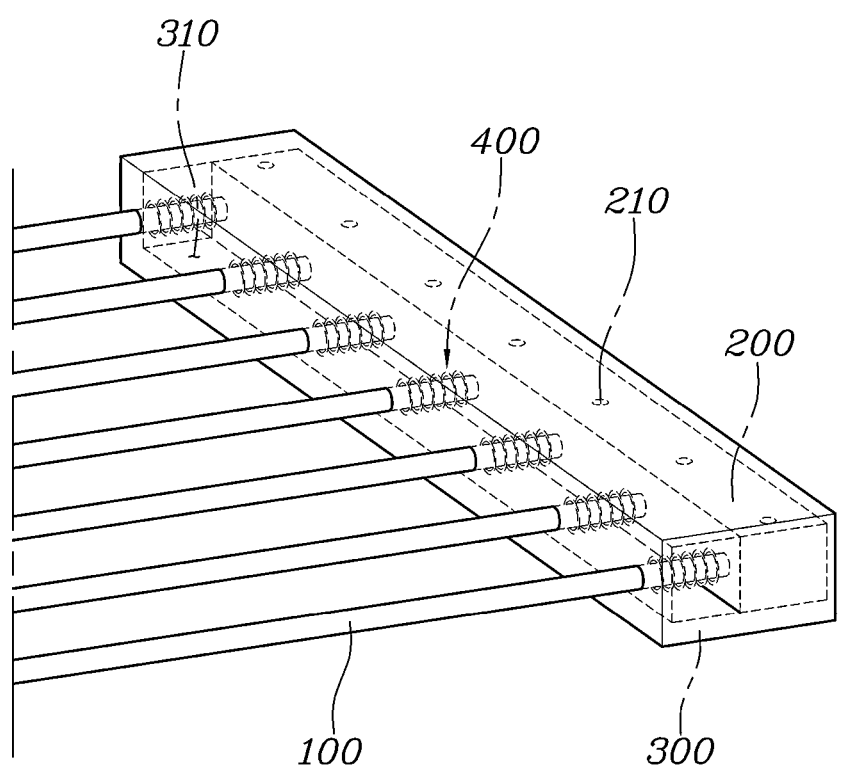
FIG. 5 is a view showing an optical fiber fixing device according to a second embodiment of the present disclosure.
Figure 6:
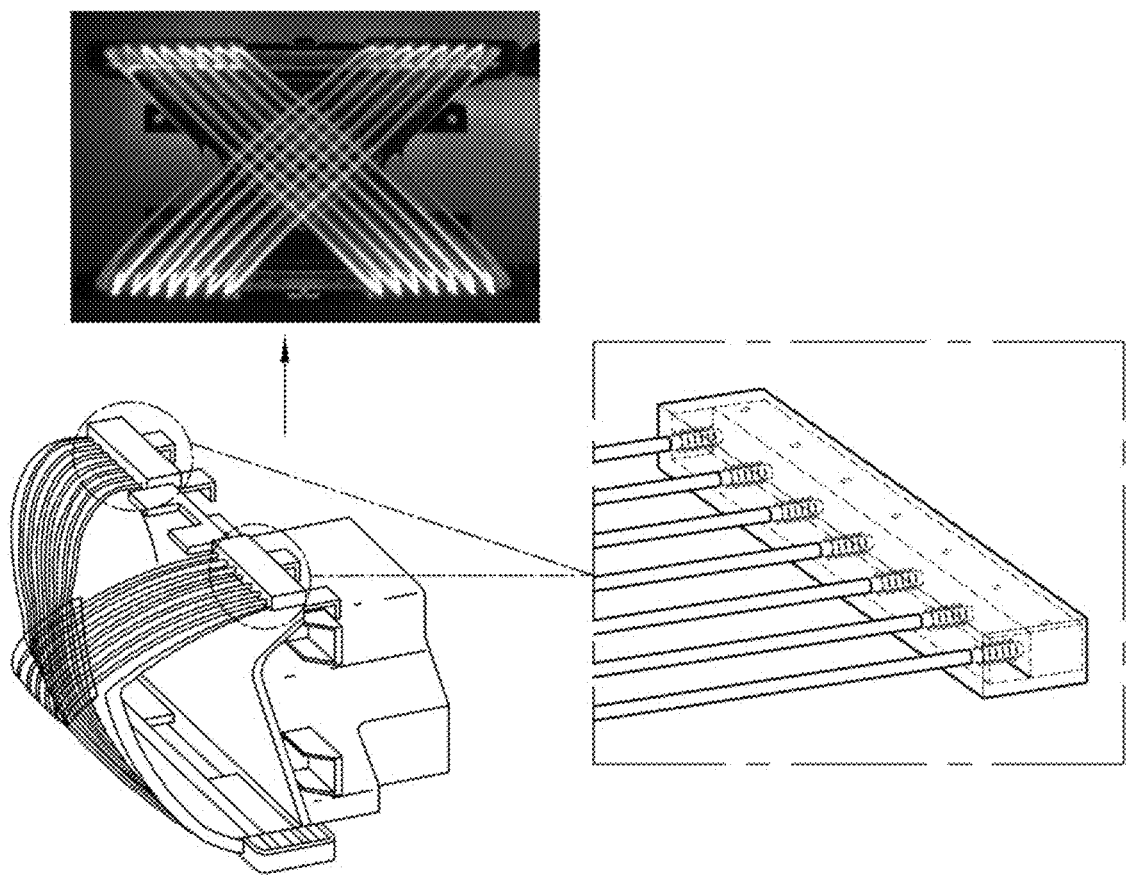
FIG. 6 is a view showing an optical fiber module to which the optical fiber fixing device according to the second embodiment of the present disclosure is applied.
Figure 7:
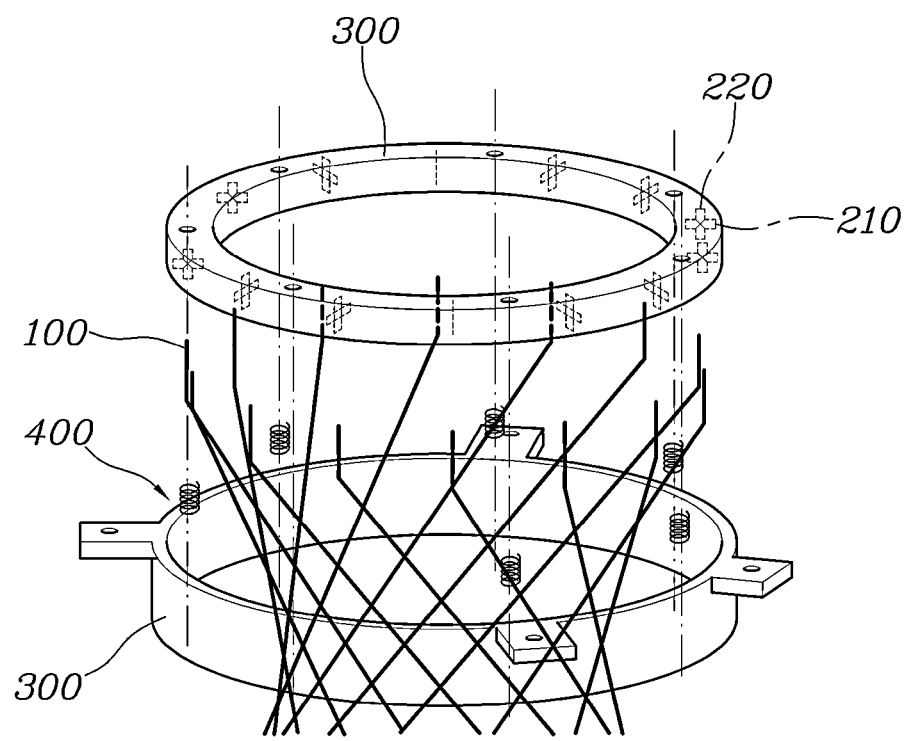
FIG. 7 is an exploded perspective view of an optical fiber fixing device according to a third embodiment of the present disclosure.
Figure 8:
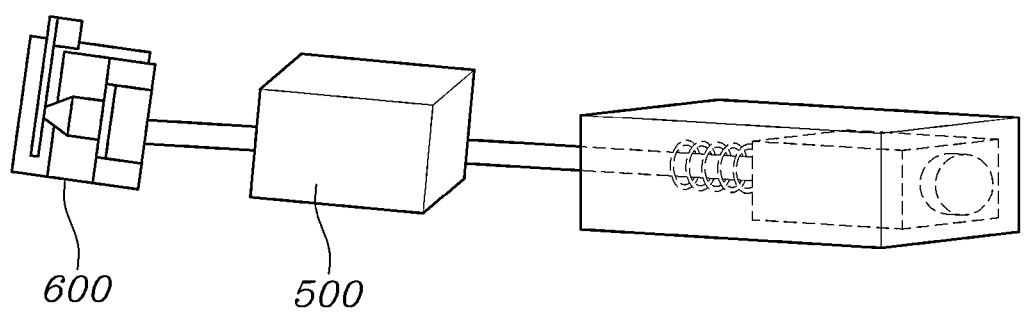
FIG. 8 is a view showing the optical fiber fixing device according to the first embodiment of the present disclosure, in which a fixing bracket and a light source are provided.
Figure 9:
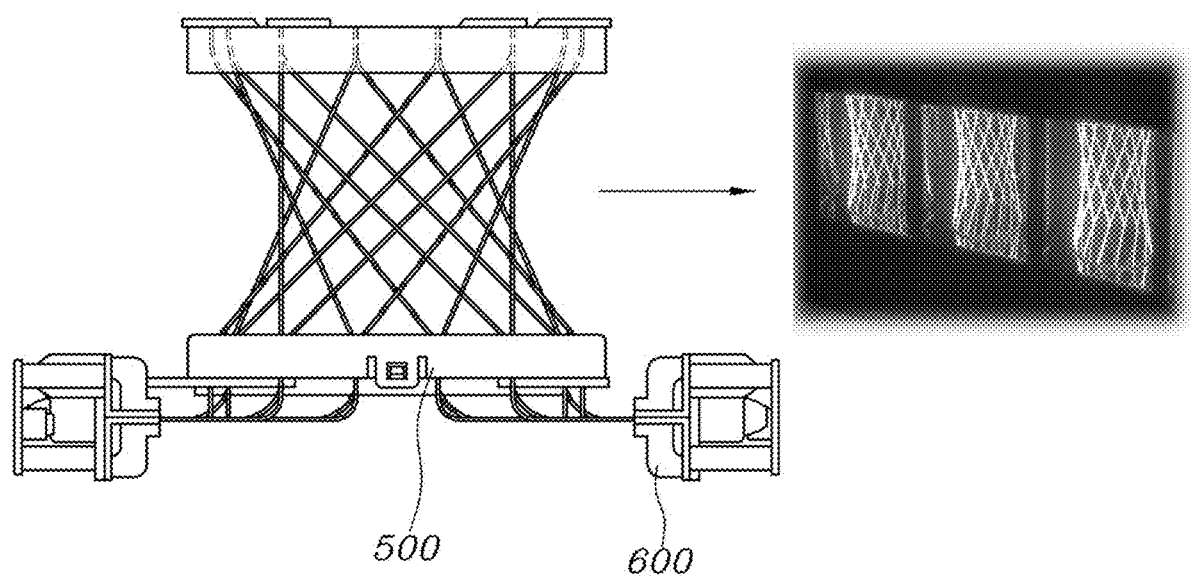
FIG. 9 is a view showing an optical fiber module to which the optical fiber fixing device according to the third embodiment of the present disclosure is applied.

FIG. 1 is an exploded perspective view of an optical fiber fixing device according to a first embodiment of the present disclosure. FIG. 2 is a view showing operation of the optical fiber fixing device according to the first embodiment of the present disclosure. FIG. 3 is a view showing the optical fiber fixing device according to the first embodiment of the present disclosure. FIG. 4 is a view showing the optical fiber fixing device according to the first embodiment of the present disclosure, in which an elastic member is implemented as a rib spring. FIG. 5 is a view showing an optical fiber fixing device according to a second embodiment of the present disclosure. FIG. 6 is a view showing an optical fiber module to which the optical fiber fixing device according to the second embodiment of the present disclosure is applied. FIG. 7 is an exploded perspective view of an optical fiber fixing device according to a third embodiment of the present disclosure. FIG. 8 is a view showing the optical fiber fixing device according to the first embodiment of the present disclosure, in which a fixing bracket and a light source are provided. FIG. 9 is a view showing an optical fiber module to which the optical fiber fixing device according to the third embodiment of the present disclosure is applied.

FIG. 1 is an exploded perspective view of an optical fiber fixing device according to an embodiment of the present disclosure. Referring to FIG. 1, an optical fiber fixing device according to the present disclosure includes a sub-bracket 200 into which one end of an optical fiber 100 is inserted and fixed. The optical fiber fixing device also includes a main bracket 300 having an insertion space 310 formed therein corresponding to the sub-bracket 200 to allow the sub-bracket 200 to slide therein in response to changes in the length of the optical fiber 100. The optical fiber fixing device further includes an elastic member 400 disposed between the sub-bracket 200 and the main bracket 300 such that one end thereof supports the main bracket 300 and the other end thereof supports the sub-bracket 200.

The optical fiber 100 is configured to totally reflect light and is made of a glass or polymer material. The optical fiber 100 changes in length according to environmental changes. In particular, the length of the optical fiber is greatly affected by changes in temperature. In detail, the length of the optical fiber increases in a high-temperature environment. The optical fiber repeatedly expands and contracts in an environment in which a high temperature and a low temperature alternate. Repeated expansion and contraction of the optical fiber 100 may cause breakage or cracking of the optical fiber 100, resulting in deterioration in light distribution performance. Further, this entails an unintended change or unclear expression of the shape of the image formed by a plurality of optical fibers, i.e. an optical fiber bundle. This may cause the shape of the image to be misrecognized.

In order to respond to changes in the length of the optical fiber 100 caused by environmental changes, the optical fiber fixing device according to the present disclosure includes the sub-bracket 200, the main bracket 300, and the elastic member 400. FIG. 2 is a view showing the operation of the optical fiber fixing device according to the embodiment of the present disclosure. When the length of the optical fiber 100 decreases, the sub-bracket 200 slides toward the inner side of the main bracket 300 within the insertion space in the main bracket 300. When the length of the optical fiber 100 increases, the sub-bracket 200 slides toward the outer side of the main bracket 300 within the insertion space in the main bracket 300. In this way, the optical fiber fixing device according to the present disclosure responds to changes in the length of the optical fiber.

The elastic member 400 serves to slide the sub-bracket 200. When the length of the optical fiber 100 decreases, the elastic member 400 contracts and slides the sub-bracket 200 toward the inner side of the main bracket 300. When the length of the optical fiber 100 increases, the elastic member 400 expands and slides the sub-bracket 200 toward the outer side of the main bracket 300.

According to the present disclosure, it is possible to immediately respond to changes in the length of the optical fiber 100. By doing so, breakage or cracking of the optical fiber 100 attributable to contraction of the optical fiber can be prevented or inhibited. Also, unintended changes in the shape of the image formed by an optical fiber bundle can be prevented or inhibited. Further, it is also possible to prevent unintended changes in the shape of the image attributable to expansion of the optical fiber 100.

The sub-bracket 200 may have an optical fiber insertion hole 220 therein into which one end of the optical fiber 100 is inserted. The sub-bracket 200 may also have an adhesive injection hole 210 therein into which an adhesive is injected in order to fix the end of the optical fiber 100 to the sub-bracket 200.

Referring to FIG. 1, the optical fiber insertion hole 220 may be formed through the sub-bracket 200. The adhesive injection hole 210 may communicate with the optical fiber insertion hole 220 inside the sub-bracket 200.

In one embodiment, the sub-bracket 200 may have a hexahedral shape or a spherical shape. However, the shape of the sub-bracket 200 may vary depending on the shape of the image to be expressed by the optical fiber bundle. In the case in which the sub-bracket 200 has a hexahedral shape, the adhesive injection hole 210 may be formed in the upper surface of the sub-bracket 200 and the optical fiber insertion hole 220 may be formed through two opposite side surfaces of the sub-bracket 200. One end of the optical fiber 100 is inserted into the sub-bracket 200 through the optical fiber insertion hole 220. Then an adhesive is injected into the adhesive injection hole 210 to primarily fix the end of the optical fiber 100 to the sub-bracket 200.

One feature of the present disclosure is to fix one end of the optical fiber 100 to the sub-bracket 200. After the end of the optical fiber 100 inserted into the optical fiber insertion hole 220 is primarily fixed by an adhesive, the end of the optical fiber 100 may be secondarily fixed to the sub-bracket 200 using a heat-staking method. FIG. 3 is a view showing the optical fiber fixing device according to the first embodiment of the present disclosure, in which the end of the optical fiber 100 penetrating the sub-bracket 200 is secondarily fixed to the sub-bracket 200 using a heat-staking method.

Referring to FIGS. 1-3, the elastic member 400 has a coil structure that surrounds the optical fiber 100. According to an embodiment, the elastic member 400 may be implemented as a coil spring 410, one end of which supports the main bracket 300 and the other end of which supports the sub-bracket 200. Alternatively, as shown in FIG. 4, the elastic member 400 may be implemented as a rib-shaped rib spring 420, which is provided at the sub-bracket 200 so as to protrude toward the main bracket 300.

The elastic member 400 enables the sub-bracket 200 to smoothly slide inside the insertion space 310 in the main bracket 300. When the optical fiber 100 expands, the elastic member 400 also expands in response thereto. When the optical fiber 100 contracts, the elastic member 400 also contracts in response thereto. The modulus of elasticity of the elastic member 400 is determined in consideration of the force generated by changes in the length of the optical fiber 100, the weight of the sub-bracket 200, and friction between the sub-bracket 200 and the main bracket 300. In order to effectively respond to the force generated by contraction and expansion of the optical fiber 100, it is desirable for the elastic member 400 to have a low modulus of elasticity. Also, it is desirable for the sub-bracket 200, to which one end of the optical fiber 100 is fixed, to have a low weight. Therefore, the sub-bracket 200 may be made of a lightweight and durable material.

FIG. 5 is a view showing an optical fiber fixing device according to a second embodiment of the present disclosure. Referring to FIG. 5, the main bracket 300 and the sub-bracket 200 are formed to be wide, i.e., have a sufficient width or dimension, in the width direction in order to fix a plurality of optical fibers thereto. The sub-bracket 200 may have therein a plurality of optical fiber insertion holes 220, which are arranged at predetermined intervals, and a plurality of adhesive injection holes 210, which are arranged at predetermined intervals. One end of each of the plurality of optical fibers 100 may be inserted into a corresponding one of the plurality of optical fiber insertion holes 220 and may be fixed to the sub-bracket 200. A plurality of elastic members 400 may be provided between the main bracket 300 and the sub-bracket 200. The number of elastic members 400 may be equal to the number of optical fibers 100.

In order to form an image, a plurality of optical fibers 100 and a plurality of elastic members 400 are gathered into a bundle. One example of such bundles is illustrated in FIG. 5. As shown in FIG. 6, it is possible to form an X-shaped image by assembling the optical fiber bundle shown in FIG. 5 to another optical fiber bundle having the same configuration.

In some cases, the elastic members 400, which are disposed between the main bracket 300 and the sub-bracket 200, may be provided only for the optical fibers 100 located at the outermost positions in the bundle. The elastic members 400 for sliding the sub-bracket 200 are not necessarily provided for all of the optical fibers 100. It may be sufficient to provide only a pair of elastic members 400 for the optical fibers 100 located at the outermost positions. However, the embodiments are not limited thereto. In other cases, the elastic members 400 may be provided at a rate of one per three or four optical fibers.

FIG. 7 is an exploded perspective view of an optical fiber fixing device according to a third embodiment of the present disclosure. The main bracket 300 may have a toroidal shape and the sub-bracket 200 may have a toroidal shape having a smaller inner diameter than the main bracket 300 so as to be seated in the main bracket 300. The sub-bracket 200 may be configured to slide upwards and downwards within an insertion space 310 formed in the main bracket 300 in response to changes in the length of the optical fibers 100.

The shapes of the main bracket 300 and the sub-bracket 200 may vary depending on the shape of the image to be expressed by the optical fibers 100. The optical fiber fixing device according to the third embodiment shown in FIG. 7 and is structured such that the sub-bracket 200 slides upwards and downwards, is suitable for the case in which the optical fibers 100 are disposed so as to be oriented in the upward-downward direction. In this case, because the downward force of gravity is applied to the sub-bracket 200, the optical fiber fixing device according to the third embodiment has the advantage of more effectively responding to contraction of the optical fibers 100.

When using the optical fiber fixing device according to the third embodiment, it is possible to form a cylindrical-shaped image using the optical fibers 100, as shown in FIG. 9.

Referring to FIGS. 8 and 9, a fixing bracket 500 may be provided at the opposite end of the optical fiber 100 in order to fix the opposite end of the optical fiber 100. Also, a light source 600 may be provided at the opposite end of the optical fiber 100 so as to be connected thereto in order to emit light to the optical fiber 100.

As should be apparent from the above description, an optical fiber fixing device of the present disclosure is capable of immediately responding to changes in the length of an optical fiber. This thereby prevents cracking of the optical fiber attributable to contraction thereof and prevents unintended changes in the shape of an image attributable to expansion of the optical fiber.

Although embodiments of the present disclosure have been described for illustrative purposes, those having ordinary skill in the art should appreciate that various modifications, additions, and substitutions are possible without departing from the scope and spirit of the inventive concept as disclosed in the accompanying claims.

What is claimed is:
1. An optical fiber fixing device comprising:
an optical fiber;
a sub-bracket configured to allow an end of the optical fiber to be inserted thereinto and fixed thereto;

a main bracket having an insertion space formed therein corresponding to the sub-bracket to allow the sub-bracket to slide therein in response to contraction or expansion of the optical fiber; and an elastic member disposed between the sub-bracket and the main bracket such that one end of the elastic member supports the main bracket and an opposite end of the elastic member supports the sub-bracket, wherein the elastic member serves to slide the sub-bracket in response to the contraction or the expansion of the optical fiber.

2. The optical fiber fixing device according to claim 1, wherein the sub-bracket has an optical fiber insertion hole formed therein to allow the end of the optical fiber to be inserted thereinto, and has an adhesive injection hole formed therein to allow an adhesive to be injected thereinto in order to fix the end of the optical fiber to the sub-bracket.

3. The optical fiber fixing device according to claim 2, wherein the optical fiber insertion hole is formed through the sub-bracket and wherein the adhesive injection hole communicates with the optical fiber insertion hole inside the sub-bracket.

4. The optical fiber fixing device according to claim 3, wherein the end of the optical fiber is primarily fixed to the sub-bracket using the adhesive and is secondarily fixed to the sub-bracket using a heat-staking method after penetrating the optical fiber insertion hole.

5. The optical fiber fixing device according to claim 1, wherein the elastic member is a coil spring having a coil structure surrounding the optical fiber, and wherein one end of the coil spring supports the main bracket, and an opposite end of the coil spring supports the sub-bracket.

6. The optical fiber fixing device according to claim 1, wherein the elastic member is a rib-shaped rib spring provided at the sub-bracket so as to protrude toward the main bracket.

7. The optical fiber fixing device according to claim 1, wherein the optical fiber is provided as a plurality of optical fibers, wherein the main bracket and the sub-bracket are formed to have a dimension in a width direction, wherein the sub-bracket has therein a plurality of optical fiber insertion holes, arranged at predetermined intervals, and a plurality of adhesive injection holes, arranged at predetermined intervals, wherein an end of each of the plurality of optical fibers is inserted into a corresponding one of the plurality of optical fiber insertion holes and is fixed to the sub-bracket, and wherein the elastic member is provided as a plurality of elastic members in consideration of a number of the plurality of optical fibers, and the plurality of elastic members is disposed between the main bracket and the sub-bracket.

8. The optical fiber fixing device according to claim 7, wherein the plurality of elastic members is disposed between the main bracket and the sub-bracket so as to be provided for optical fibers located at outermost positions.

9. The optical fiber fixing device according to claim 1, wherein the main bracket has a toroidal shape, wherein the sub-bracket has a toroidal shape having a smaller inner diameter than the main bracket so as to be seated in the main bracket, and wherein the sub-bracket slides in the insertion space in the main bracket in response to changes in length of the optical fiber.

10. The optical fiber fixing device according to claim 1, further including:

a fixing bracket provided at an opposite end of the optical fiber in order to fix the opposite end of the optical fiber.

11. The optical fiber fixing device according to claim 1, further including:

a light source provided at an opposite end of the optical fiber so as to be connected to the optical fiber in order to emit light to the optical fiber.

* * * * *